Patented Jan. 28, 1930

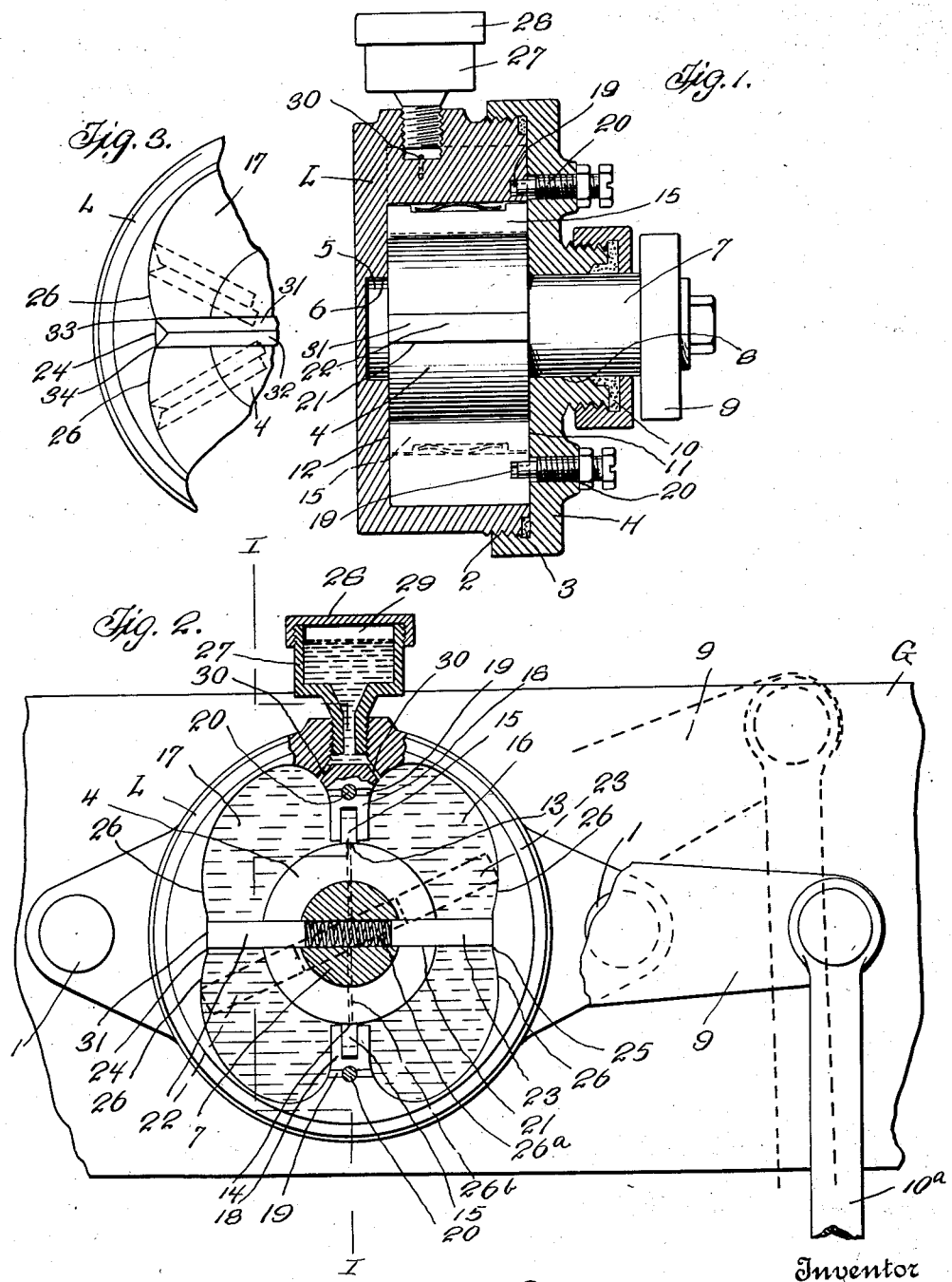

1,744,926

UNITED STATES PATENT OFFICE

DESIDERIUS SIMON, OF NEW YORK, N. Y.

AUTOMATIC SHOCK ABSORBER

Application filed June 5, 1924. Serial No. 717,967.

This invention relates to a shock absorber for automobiles and similar vehicles, the same being an improvement over the shock absorber shown and described in my pending application, Serial No. 700,315.

An object of the present improvement is to provide more efficient means whereby the shock absorber will automatically accommodate itself in response to the varying type of road surface and speed of the vehicle.

A more detailed object is to so improve the construction disclosed in said pending application as to provide for a relatively greater displacement of fluid within the device for any given relative movement of the operating lever.

A further object is to so design the device that it will offer some, but not a great, resistance against the relatively slight vertical movements of the vehicle parts and thus offer a desirable slight cushioning effect upon the action of the vehicle springs during such movements of the vehicle parts as occur for instance when the vehicle is riding over a smooth road.

A further object is to so construct the device that desirable amounts of resistance may be offered against what may be termed the "shock" and "rebound" movements of the vehicle parts and in which the degree of resistance offered will at all times be governed automatically in response to the rapidity with which the functions are performed and hence with regard to the speed and travel and the road conditions.

A further object is to so construct the device that the above characteristics will appear with equal prominence on both sides of a central or normal position.

Other objects and aims of the invention more or less specific than those referred to will be in part obvious and in part pointed out in the course of the following description of the elements, combinations, arrangements of parts, and applications of principles constituting the invention, and the scope of protection contemplated will be indicated in the appended claims.

In the accompanying drawings which are to be taken as a part of this specification, and in which I have shown merely a preferred form of embodiment of the invention:

Fig. 1 is a vertical sectional view taken substantially upon the plane of line I—I of Fig. 2;

Fig. 2 is a side elevational view of the parts appearing in Fig. 1, the cover being removed and parts being shown in section for the better disclosure of details, the whole being shown mounted upon the side frame member of a vehicle, and Fig. 3 is a view similar to the left-hand end portion of Fig. 2 but illustrating a modified construction of the paddles employed.

Referring to the drawings for describing in detail the structure which is illustrated, the reference character L indicates the main body or casing of the device. This is mounted upon one of the movable parts of the vehicle, as for instance on the side frame G, and may be secured thereto as for instance by means of bolts or the like, as 1—1.

The cover H is provided, preferably connected with the body L by having screw connection therewith as indicated by the reference character 2, there being provided a suitable gasket or the like, as 3, so that when said cover is screwed home it will provide a sufficiently tight joint to prevent possible passage of liquid between the cover and body.

Within the body and held by the cover is a cylindrical rotor 4, having a concentric bearing extension 5 on one side thereof received within a bearing 6 of the body. A similar concentric bearing extension 7 is provided on the opposite side of the rotor within a bearing 8 of the cover. This bearing 8 is formed entirely through the cover, and the extension 7 continues through said bearing and carries at its outer end an operating lever 9 fixedly connected thereto.

A suitable stuffing box structure as 10 is provided for properly sealing the joint between the bearing and the extension 7 against possible egress of fluid from within the casing while yet permitting free rotary movement of the extension, and consequently of the rotor 4 during any up and down swinging movement of the lever, it being understood of course that the outer end of the lever is intended to be connected with a relatively independently movable portion of the vehicle as for instance the vehicle axle, a suitable connecting link as 10ᵃ being illustrated for this purpose. The cavity which is provided by the casing and its cover for containing the rotor 4 is shaped so that its front and rear walls 11 and 12 rest against the front and rear surfaces of the rotor respectively. Its side walls are shaped so that they engage the peripheral surface of the rotor only at two diametrically opposite points, as at 13 and 14, said points being preferably in a common vertical plane, and there being provided at the points of engagement suitable wearing plates 15 spring-pressed for more efficiently sealing the juncture between said side walls and the rotor, and dividing the interior of the casing into two separate halves or compartments as 16 and 17, between which communication is had by means of a pair of passages 19 formed through the portions 18 of the side walls which project inwardly for contacting with the rotor as just described, said portions being here conveniently referred to as partition-forming portions.

The size of the passages 19 may be altered at will, as by means of adjustable screws or the like, as 20, which project exteriorly of the casing for convenient manipulation.

The entire interior of the casing is intended to be filled with oil, or other suitable fluid, and the fluid contained in the respective compartments 16 and 17 will be shut off from communication with the fluid in the opposite compartment by means of the partition portions 18 of the casing except that oil from one compartment may pass into the other through the passages 19 in regulated quantities according to the position of the screws 20.

Extending diametrically through the rotor is a rectangular slideway 21, and within this slideway is mounted a pair of paddles 22 and 23, both slideway and paddles being arranged so that in the normal position of the rotor they will extend in a horizontal plane, the outer ends of the paddles respectively being in surface contact with opposite contact parts 24 and 25 respectively of the side wall portions of the casing.

A suitable compression spring 26ᵃ is provided within the rotor and positioned between the inner end surfaces of the paddles for constantly urging the paddles radially outwardly.

Suitable passages as 26ᵇ are provided for permitting flow of oil into and out of the space between the inner ends of the paddles as said paddles move to follow the surface contour of the side walls of the casing. Above and below the contact portions 24 and 25, the side wall portions as 26 of the casing curve abruptly outwardly away from the rotor, so that said contact portions 24 and 25, although spaced an appreciable distance from the rotor, are yet relatively closer to the rotor than said wall portions 26 and serve normally to hold the paddles 22 and 23 in their inner positions, the chambers which are defined above and below said paddles being tapered to enlarged proportions in both directions away from the contact portions.

A suitable filler cup 27 is provided at the upper side of the casing having a tight screw cap 28 thereon. It is intended that the oil within the casing shall extend up into the cup 27 but that said cup shall be only partly filled, thus leaving an air space 29 above the level of the oil. Minute passages as 30 are provided as indicated between the cup and the compartments 16 and 17, so that portions of the oil within the cup may flow into the casing for replacing any slight leakage from the casing while at the same time preventing any appreciable travel of oil outwardly from the compartments into the cup during the operation of the mechanism. This cup is also useful in that it comprises a convenient means for at all times ascertaining the level of the oil and also of permitting expansion and contraction of the oil due to changes of temperature, etc.

During the normal running of the vehicle over a smooth roadway, at which time there is only slight relative movement between the vehicle axle and frame and it is desirable that the vehicle springs shall function softly and easily the outer ends of the paddles 22 and 23 will oscillate back and forth across the faces of the contact portions 24 and 25 without being able to move outwardly of the rotor. The fluid, which must necessarily be displaced from first one chamber and then another as the paddles oscillate, is of only small quantity. Its displacement, however, requires some pressure in order to force it through the passages 19. The amount of pressure required depends upon the size of said passages and since the size of said passages may be readily adjusted, it follows that any suitable degree of resistance may be provided against these oscillatory movements of the paddles.

When the vehicle is passing at slow speed over a very rough roadway, at which time the excessive flexing of the vehicle springs and their consequent tendency to excessive rebound requires the maximum shock absorbing quality of this device to be called into use, it will be noted that at each "shock" movement of the vehicle parts, the outer ends of the paddles will pass off of the contact parts 24 and 25 and to appreciable distances beyond said contact parts, as for instance as indicated by the heavy dotted lines in Figure 2. The spring 26ᵃ will urge the paddles outwardly in an effort to follow the contour of the surface portions 26 of the casing, and if the swinging movement of the paddles is sufficiently slow then the outer ends will truly follow the surfaces 26 and a desirable resistance will be generated to oppose too excessive "shock" movement. The swinging movement of the paddles however is usually accomplished so quickly that the paddles will not be able to follow the walls 26 and the fluid will pass around the outer ends of the paddles so that in this instance only very slight resistance will be present to oppose the "shock" movement.

From this also, it will be seen:

First: That what is for convenience termed the "shock" movement of the rotor, that is, the movements of the paddles in directions away from the contact portions 24 and 25, are opposed by engagement of the progressively protruding ends of the paddles against the body of fluid in front of it. During this period the fluid in front of the paddle will move partly through the passage 19 of the opposing partition and partly around the outer end surface of the paddle. Because of the shape of the outer end surface, as 31, of the paddle, and the relatively angular disposition of the wall portion 26, it will be quite possible for a portion of the fluid to move around the paddle whenever the paddle is moving in a direction away from the contact points 24 and 25, but quite impossible for the fluid to return again around the paddle when the paddle returns toward the contact points.

Second: That what is for convenience here termed the "rebound" movements of the rotor, that is, the return movement of the paddles from their "shock" positions to their normal positions, are positively opposed by the engagement of the protruding end of the paddle against the pocketed fluid requiring that all of the pocketed fluid be passed through the passage 19 of the opposing partition before return of the paddle to normal is possible.

Both the "shock" and "rebound" movements of the rotor are more or less opposed to the "rebound" movements but the "rebound" movements encounter a relatively greater opposition than the shock movements.

Now it will be apparent that the amount of opposition present in either the "shock" or the "rebound" movements of the rotor will depend upon just how much of the end portions of the paddles protrude through the period of said movements, and it will be apparent also that just how much or how little of said end portions protrude during any cycle of movement is dependent upon several factors, to wit: the strength of the spring 26, the ease of sliding fit of the paddles within their slideways, the viscosity of the fluid, the size of the passages 26, and the degree of rapidity with which the cycle takes place. All of these factors except the last are simple matters of mechanical calculation, and when they have been once determined, then the factor of rapidity of movement remains to automatically control the shock absorbing qualities of the mechanism in strict conformity to the need of shock absorbing value.

If the vehicle is passing over such roadway and at such speed that the rapidity of movement is so great that the paddles do not have time to move appreciably from their normal inner positions, then the opposition offered to said movements is relatively less than when the movements are less rapid, and this is a proper condition, since under such circumstances the vehicle springs are to be allowed their free cushioning through successive "rebound" movements following so rapidly their shock movements that no considerable rebound is possible.

If the vehicle is passing over such roadway and at such speed that the shock and rebound movements occur with reduced rapidity, then the paddles will move outwardly at each "shock" movement and the pocketed fluid will pass the "rebound" movement in degree according to the distance to that which the paddles protrude, the maximum resistance to present only when the "shocks" of movement are so slow that the paddles will engage against the wall surfaces 26 at the extreme extent of the "shock" movements of the paddles.

The slow, bouncy movements of the vehicle during riding over a rough roadway will thus generate the maximum amount of shock absorbing value available while the less bouncy movements occasioned by a smoother roadway or greater speed will generate a correspondingly less degree of shock absorbing value. The mechanism is thus correctly said to be effective in its shock absorbing values to a degree automatically controlled by the quality of roadway and the speed of travel.

It will be noted from the above, and a comparison thereof with what is disclosed in the pending application referred to, that an important feature of improvement herein lies in the fact that the paddles at all times project a considerable distance outwardly of the rotor so they thus during their oscillatory movements always require the displacement of an appreciable quantity of fluid, the partition forming portions of the casing being provided to render this arrangement of the paddles effective. But in every instance the space behind the paddles will be filled with fluid, either through the passages 19 or by leakage around the paddles, and this fluid, being pocketed between the paddles and the opposing partitions 18, will stand to resist return of the paddles to normal. The same action now takes place as before, except that a relatively greater quantity of fluid requires to be displaced through the passages 19 and a correspondingly greater force and period of time is required for its displacement.

From this it will be seen:

First: That what is for convenience termed the "shock" movement of the rotor, that is, the movements of the paddles in directions away from the contact portions 24 and 25, are opposed by engagement of the progressively protruding ends of the paddles against the body of fluid in front of it. During this period the fluid in front of the paddles will move partly through the passage 19 of the opposing partition and partly around the outer end surfaces of the paddles. Because of the shape of the outer end surfaces, as 31, of the paddles, and the relatively angular disposition of the wall portions 26 it will be quite possible for a portion of the fluid to move around the paddles whenever the paddles are moving in a direction away from the contact parts 24 and 25, but quite impossible for the fluid to return again around the paddles when the paddles return toward the contact parts, and Second: That what is for convenience here termed the "rebound" movements of the rotor, that is, the return movement of the paddles from their "shock" positions to their normal positions, are positively opposed by the engagement of the protruding end of the paddles against the pocketed fluid requiring that all of the pocketed fluid be passed through the passages 19 of the opposing partitions before return of the paddles to normal is possible.

Both the "shock" and "rebound" movements of the rotor are more or less opposed but the "rebound" movements encounter a relatively greater opposition than the "shock" movements.

The tapering, or angular disposition of the wall parts 26 relative to the outer surface of the rotor also serves to alter the ratio of the quantity of fluid to be displaced at each degree of rotation of the rotor. The further the "shock" movement of the rotor is carried the greater is the ratio of the quantity of fluid placed behind the paddles and requiring to be displaced on the return of the paddles. And, likewise, the nearer the paddles approach the contact parts 24 and 25 the less is the ratio of the quantity of fluid to be displaced. Hence it is seen that the ratio of shock absorbing value inherent to this device varies according to the severity of the shock, and thus according to the need of shock absorbing value.

Now it will be apparent also that the amount of opposition present in either the "shock" or the "rebound" movements of the rotor will depend upon just how much of the end portions of the paddles protrude. Just how much, or how little, of said end portions protrude during any cycle of movement is dependent upon several factors, to wit: the strength of the spring 26ª, the ease of sliding fit of the paddles within their slideways, the viscosity of the fluid, the size of the passages 26ª, and the degree of rapidity with which the cycle takes place. All of these factors except the last are simple matters of mechanical calculation, and when they have been once determined, then the factor of rapidity of movement remains to automatically control the shock absorbing qualities of the mechanism in strict conformity to the need of shock absorbing value.

If the vehicle is passing over such roadway and at such speed that the "shock" and "rebound" movements occur with reduced rapidity, then the paddles will move outwardly at each "shock" movement and the pocketed fluid will oppose the "rebound" movement in degree according to the distance to that which the paddles protrude, the maximum resistance to rebound being present only when the "shock" movements are so slow that the paddles will engage against the wall surfaces 26 at the extreme limits of the "shock" movements of the paddles.

The slow, bouncy movements of the vehicle during riding over a rough roadway will thus generate the maximum amount of shock absorbing value available, while the less bouncy movements, occasioned by a smoother roadway or greater speed, will generate a correspondingly less degree of shock absorbing value. The mechanism is thus correctly said to be effective in its shock absorbing values to a degree automatically controlled by the quality of roadway and the speed of travel.

It will be noted from the above, and a comparison thereof with what is disclosed in the pending application referred to, that an important feature of improvement herein lies in the fact that the paddles at all times project a considerable distance outwardly of the rotor so that they thus, during their oscillatory movements, always require the displacement of an appreciable quantity of fluid, the partitions 18 being provided to render this arrangement of the paddles effective.

Referring now to the modification shown in Figure 3, it will be seen that it is a feature of this invention to duplicate the paddles 22, if desired, so that said paddles will be in fact two separate paddles as 31 and 32, each independently spring pressed, and each being beveled off at its outer end so as to form corner edge surfaces 33 and 34 for scraping against the side walls of the casing so as to be equally effective in this regard irrespective of the direction of movement of the rotor. While the operation of these paddles will of course be subject to speed effects in substantially the same manner as already set forth yet it will be seen that a considerably more effective resistance is offered for preventing flow of fluid around the outer ends of the paddles particularly on the slow "shock" movements. A correspondingly greater resistance to these "shock" movements will thus be present.

As many changes could be made in this construction without departing from the scope of the invention defined in the following claims, it is intended that all matter contained in the above description, or shown in the accompanying drawings, shall be interpreted as illustrative only and not in a limiting sense.

Having thus described my invention, that I claim as new and desire to secure by Letters Patent is:—

1. A shock absorber for vehicles, comprising a casing adapted to be connected with one part of the vehicle, a rotor arranged within said casing, an operating arm connected with said rotor and having connection with a relatively movable part of the vehicle to rotate the rotor, the casing being adapted to contain a quantity of fluid, partitions within the casing co-acting with the rotor to divide the interior of the casing into separate compartments, and paddles projecting from the rotor into said compartments respectively adapted to utilize the fluid within said compartments for cushioning movements of the rotor, said paddles being spring pressed towards the outer walls of said compartments, and said outer walls being of irregular contour to thereby alter the distance to which said paddles may be projected in different rotary positions of the rotor.

2. A shock absorber for vehicles, comprising a casing adapted to be connected with one part of the vehicle, a rotor arranged within said casing, an operating arm connected with said rotor and having connection with a relatively movable part of the vehicle to rotate the rotor, the casing being adapted to contain a quantity of fluid, partitions within the casing co-acting with the rotor to divide the interior of the casing into separate compartments, and paddles projecting from the rotor into said compartments respectively adapted to utilize the fluid within said compartments for cushioning movements of the rotor, said paddles being spring pressed towards the outer walls of said compartment, and said outer walls being shaped to provide contact parts spaced away from the rotor and arranged to be engaged by the outer ends of the paddles when said paddles are in normal position, the said outer walls being inclined outwardly away from said contact parts as both sides of said contact parts for the purpose set forth.

3. A shock absorber for vehicles, comprising a casing adapted to be connected with one part of the vehicle, a rotor arranged within said casing, an operating arm connected with said rotor and having connection with a relatively movable part of the vehicle to rotate the rotor, the casing being adapted to contain a quantity of fluid, partitions within the casing co-acting with the rotor to divide the interior of the casing into separate compartments, and paddles projecting from the rotor into said compartments respectively adapted to utilize the fluid within said compartments for cushioning movements of the rotor, said paddles being spring pressed towards the outer walls of said compartment, and said outer walls being of irregular contour to thereby alter the distance to which said paddles may be projected in different rotary positions of the rotor and said paddles being in pairs and being beveled at their outer ends for more efficient contact with the irregular outer walls of the compartments.

4. A shock absorber for vehicles, comprising a casing adapted to be connected with one part of the vehicle, a rotor arranged within said casing, an operating arm connected with said rotor and having connection with a relatively movable part of the vehicle to rotate the rotor, the casing being adapted to contain a quantity of fluid, partitions within the casing co-acting with the rotor to divide the interior of the casing into separate compartments, and paddles projecting from the rotor into said compartments respectively adapted to utilize the fluid within said compartments for cushioning movements of the rotor, the outer walls of the casing being of irregular contour, and said paddles being slidably mounted upon the rotor and adapted to engage against said walls.

5. A shock absorber for vehicles, comprising a casing adapted to be connected with one part of the vehicle, a rotor arranged within said casing, an operating arm connected with said rotor and having connection with a relatively movable part of the vehicle to rotate the rotor, the casing being adapted to contain a quantity of fluid, partitions within the casing co-acting with the rotor to divide the interior of the casing into separate compartments, and paddles projecting from the rotor into said compartments respectively adapted to utilize the fluid within said compartments for cushioning movements of the rotor, said paddles being slidably mounted within the rotor to move radially thereof, the outer walls of said casing having parts against which the outer ends of said paddles normally engage, and said outer walls having parts inclined outwardly from said first mentioned parts at both sides of said first mentioned parts for the purpose set forth.

6. A shock absorber for vehicles, comprising a casing adapted to be connected with one part of a vehicle, a carrier member movable within said casing having connection with a relatively movable part of the vehicle to move said carrier member, an arm connected with said carrier member to move therewith, the casing being adapted to contain a quantity of fluid, said arm projecting from said carrier member intended to engage the inner wall of the casing to utilize the fluid for cushioning movements of said carrier member, means urging said arm outwardly of the carrier member toward the mentioned casing wall, said mentioned casing wall having a part against which the outer end of said arm normally engages, and said mentioned wall having other parts inclined outwardly from the first mentioned part at both sides of said first mentioned part for the purpose set forth.

In testimony whereof I affix my signature.

DESIDERIUS SIMON.